(12) United States Patent
Cadwell et al.

(10) Patent No.: US 6,267,228 B1
(45) Date of Patent: Jul. 31, 2001

(54) CONVEYOR BELT TRACKING AND TENSIONING SYSTEM

(76) Inventors: Lawrence O. Cadwell, 276 Warner Ave. North, Mahtomedi, MN (US) 55115; Kevin A. Nesdahl, 11528 Able St. NE., Blaine, MN (US) 55434

( * ) Notice: Subject to any disclaimer, the term of this patent is extended or adjusted under 35 U.S.C. 154(b) by 0 days.

(21) Appl. No.: 09/386,178

(22) Filed: Aug. 31, 1999

(51) Int. Cl.[7] .......................... B65G 39/071; B65G 23/44
(52) U.S. Cl. .......................... 198/806; 198/814; 198/816
(58) Field of Search .......................... 198/814, 806–808, 198/813, 816

(56) References Cited

U.S. PATENT DOCUMENTS

| 752,202 | 2/1904 | Chritton | 74/241 |
|---|---|---|---|
| 2,160,057 | 5/1939 | Carus et al. | 198/202 |
| 2,532,987 | 12/1950 | Berndt | 74/241 |
| 2,553,473 | 5/1951 | Reimel | 192/54 |
| 3,702,131 | * 11/1972 | Stokes et al. | 198/806 |
| 5,186,313 | * 2/1993 | Denker et al. | 198/806 |
| 5,717,984 | * 2/1998 | Wong | 198/806 |
| 5,896,979 | * 4/1999 | Hokari et al. | 198/814 |

FOREIGN PATENT DOCUMENTS

491550 * 9/1976 (SU) .................................... 198/806

* cited by examiner

Primary Examiner—Christopher P. Ellis
Assistant Examiner—Mark A. Deuble
(74) Attorney, Agent, or Firm—David George Johnson

(57) ABSTRACT

A device to permit manual adjustment of the track or path of a conveyor belt (1) while providing constant, predetermined belt tension. A removable conveyor roller (23) is supported by a pivotable yoke (11), which is pivoted about a shaft (12) from a nonoperational position of no belt tension, at which point cleaning and regular maintenance take place, to the operating position of full belt tension. Conveyor belt tension is provided by at least one spring (10), the spring force increasing with deflection during the pivoting motion of the roller yoke (11) into the normal operating position. The spring force resists the motion of a pivoting plate (8) to slide in a plane relative to the fixed conveyor bed (18) along an adjustable axis. Force is transmitted through the pivoting shaft (12) to the yoke (11) which creates tension in the conveyor belt (1) without exceeding the load limitations of the conveyor belt (1) or the roller shaft (9) bearings. An adjustable axis between a sliding plate (39) and a pivotable plate (32) can be rotated about a spindle (37) on the conveyor bed (38) to control the orientation of the conveyor roller (23).

11 Claims, 8 Drawing Sheets

CONVEYOR BELT TRACKING AND TENSIONING SYSTEM

FIELD OF THE INVENTION

The present invention relates generally to a method of manufacture and a device for controlling the behavior of a moving conveyor belt, and more specifically to an apparatus for providing a tensile force to a conveyor belt.

DESCRIPTION OF RELATED TECHNOLOGY

An endless moving conveyor belt is useful for transporting articles from one location to another. Existing devices thread or train the endless moving belt around spaced apart shafts. Typically, some means is provided for adjusting the location of at least one of the shafts in order to provide proper tension to the moving belt. Additionally, some means is provided to adjust the angle of the shafts relative to each other in order to urge the conveyor belt to track consistently along a desired path. One problem with such devices is that an excessive amount of force may sometimes be applied to one or both sides of the adjustable shaft, thereby causing damage to the conveyor belt or premature failure of the shaft bearings. Examples of such belt guides are disclosed in U.S. Pat. Nos. 752,202; 2,160,057; 2,532,987 and 2,553,473.

SUMMARY OF THE INVENTION

Ideally, the mechanism that provides belt tensioning should be completely independent of the device that adjusts the belt tracking angle via the movable shaft. Further, the belt tensioning force should be predetermined and fixed, remaining constant while the belt tracking path remains adjustable during normal conveyor operation. The present invention provides an apparatus for manually adjusting the tracking position of a conveyor belt while providing constant, predetermined belt tension. Conveyor belt tension is provided by a spring. The spring deflection is selected to provide a force within an acceptable range determined by each specific application and allows for slight variation within the tolerance limits of the positioning components. A second mechanical linkage can be manipulated to control the angle within the horizontal plane of the tensioning linkage relative to the direction of belt travel in order to urge the belt to track in the desired direction.

DESCRIPTION OF THE PREFERRED EMBODIMENTS

Figure 1:
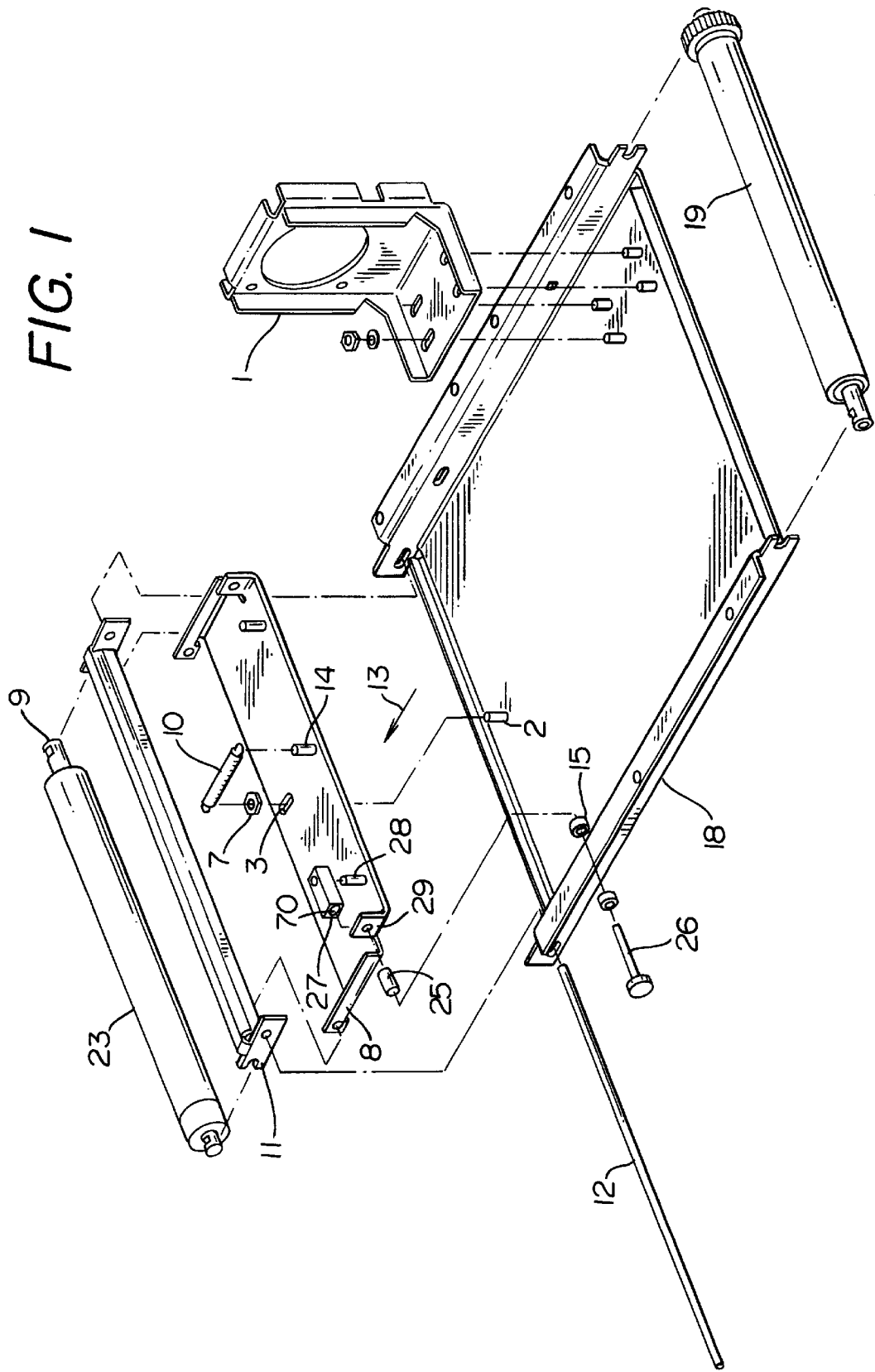
FIG. 1 is an exploded perspective view of an apparatus constructed according to the principles of the present invention which utilizes a single tension spring.

Referring to FIGS. 1, 4, 5 and 8, a removable conveyor roller 23 is seen to be supported by a yoke 11. The roller 23 is mounted on yoke 11 so as to be substantially parallel to and pivotable about shaft 12. A tensile force is applied to conveyor belt 1 by spring 10. The yoke 11 is mounted to pivot plate 8, which is itself mounted to slider bed 18.

Figure 4:
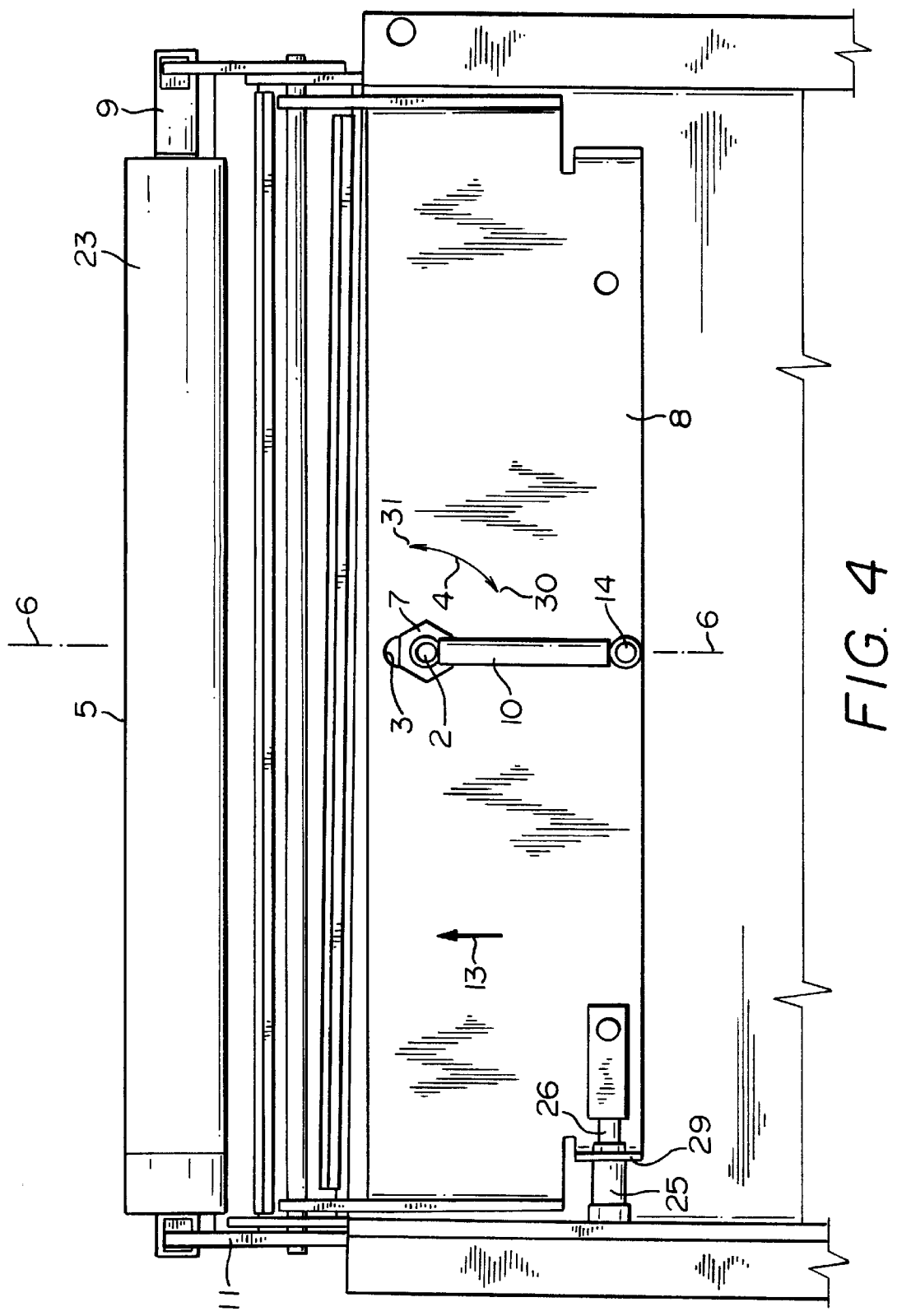
FIG. 4 is a plan view of a portion of the present invention as depicted in FIG. 1.
Figure 5:
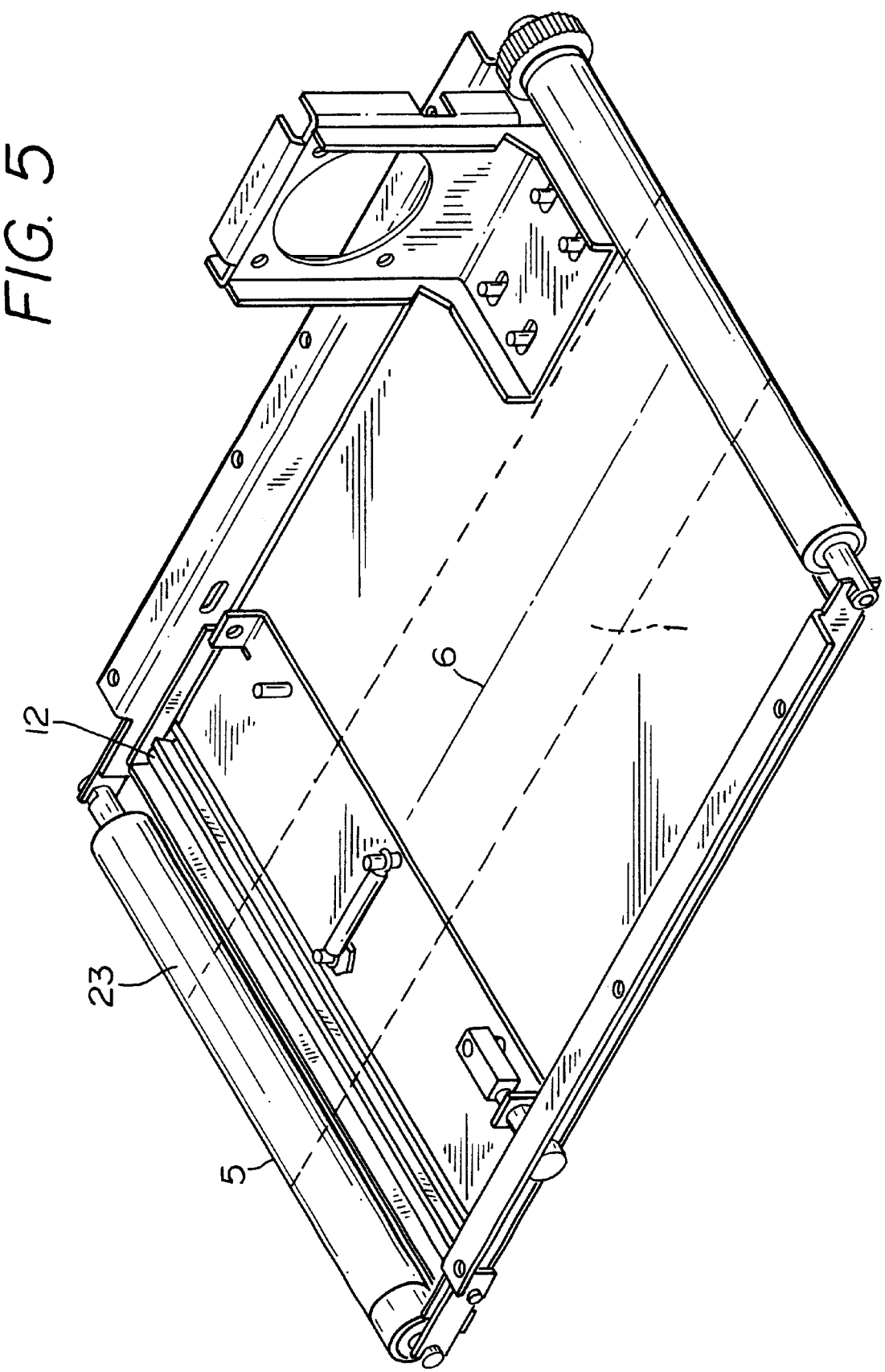
FIG. 5 is a perspective view of the present invention as depicted in FIG. 1.

Pivot plate 8 is pivotably mounted to the slider bed 18 by inserting spindle 2 through orifice 3 of pivot plate 8. Pivot adjustment bushing 7 is slidably mounted within orifice 3 to prevent lateral movement of the spindle 2 within the orifice 3. As seen in FIG. 4, the ability of the pivot plate 8 to rotate in the direction of arc 4 offsets the crown 5 of conveyor roller 23 from the longitudinal center line 6 of conveyor belt 1. Simultaneously the longitudinal axis 9 of roller 23 will be instantaneously tilted or rotated away from a perpendicular relationship to conveyor centerline 6.

This movement of the pivot plate 8 will causes the path of conveyor belt 1 to shift or reorient its direction so that the belt centerline 6 reestablishes its perpendicular relationship to roller axis 9. In this manner the belt 1 continuously tracks or follows the direction of the conveyor roller 23. Due to the slotted or elongated shape of orifice 3, pivot plate 8 is free to move in a longitudinal direction substantially parallel to belt centerline 6.

The tension spring 10 biases the pivot plate 8 in the direction of arrow 13 insofar as spindle 2 is anchored to slider bed 18, the tension spring 10 therefore pulling pivot plate spindle 14 toward spindle 2. The conveyor roller 23 and mounting yoke 11, being attached to pivot plate 8, are also urged in the direction of arrow 13, thereby providing a means of applying tension to conveyor belt 1.

The extent of rotary travel of pivot plate 8 along arc 4 is controlled by the adjustment screw 26 and the associated compression spring 25. The adjustment screw is inserted through a bearing 73 within the wall of slider bed 38 and into the threaded bore 70 of the pivot adjustment block 27, the block 27 being pivotably mounted on spindle 28. Tightening the adjustment screw 26 will pull the end 29 of pivot plate 8, causing the plate 8, as well as yoke 11 and conveyor roller 23, to pivot around spindle 2 and follow the path defined by arrowhead 30 of arc 4. Loosening the adjustment screw 26 will allow the compression spring 25 to force the end 29 of pivot plate 8 in the opposite direction defined by arrowhead 31 of arc 4. Thus, manipulation of the adjustment screw 26 permits tracking of the belt 1 in either direction as defined by arc 4. In an optional embodiment (not shown), the adjustment screw 26 would be mounted in a captive configuration, permitting the screw 26 to apply a force in either direction, thus eliminating the need for compression spring 25 and providing positive angular displacement of the pivot plate 8. In practice, the conveyor belt 1 will be tracked as desired by manipulation of the adjustment screw 26 by the conveyor operator (not shown).

Figure 2:
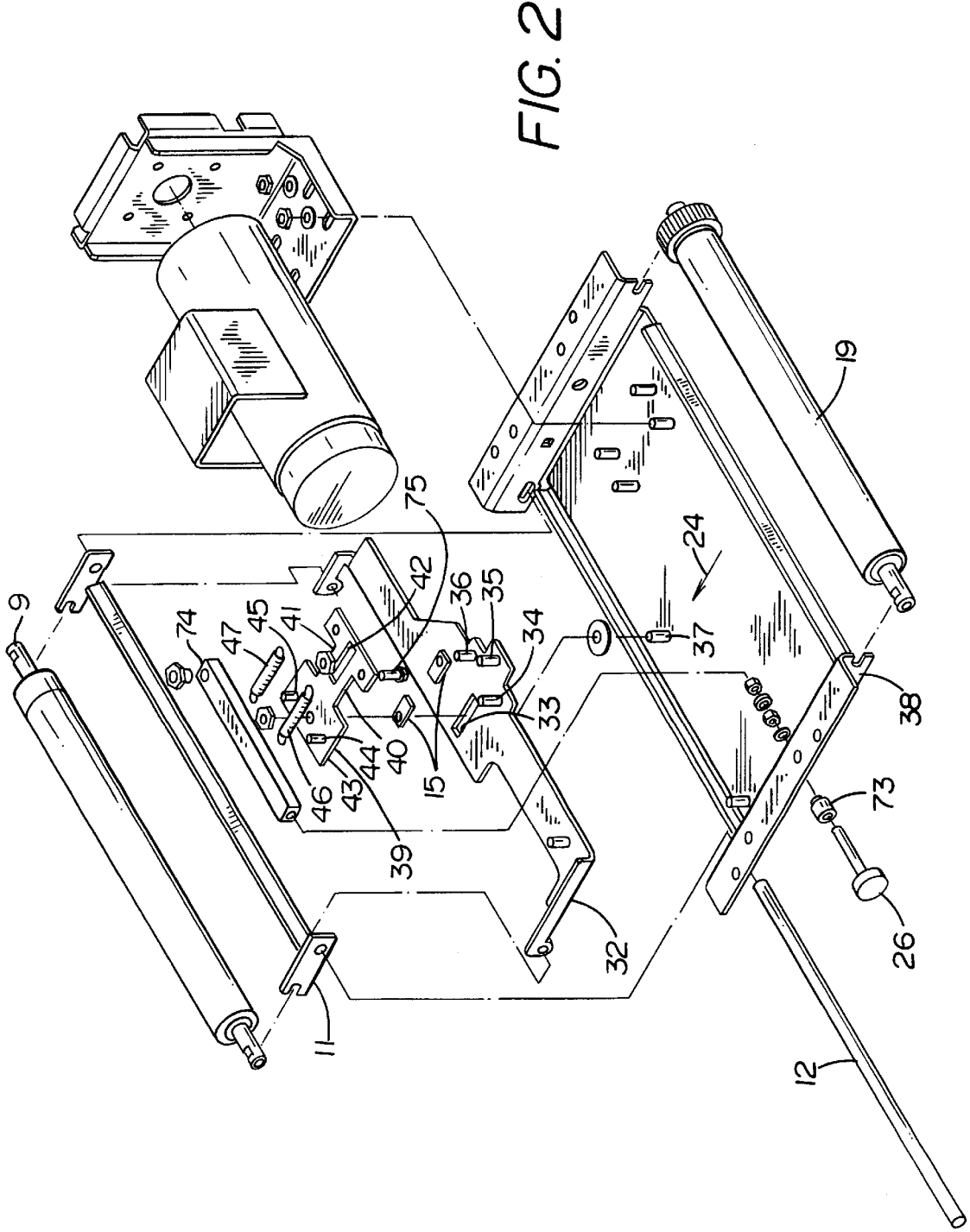
FIG. 2 is an exploded perspective view of a second embodiment of the present invention which utilizes two tension springs.
Figure 6:
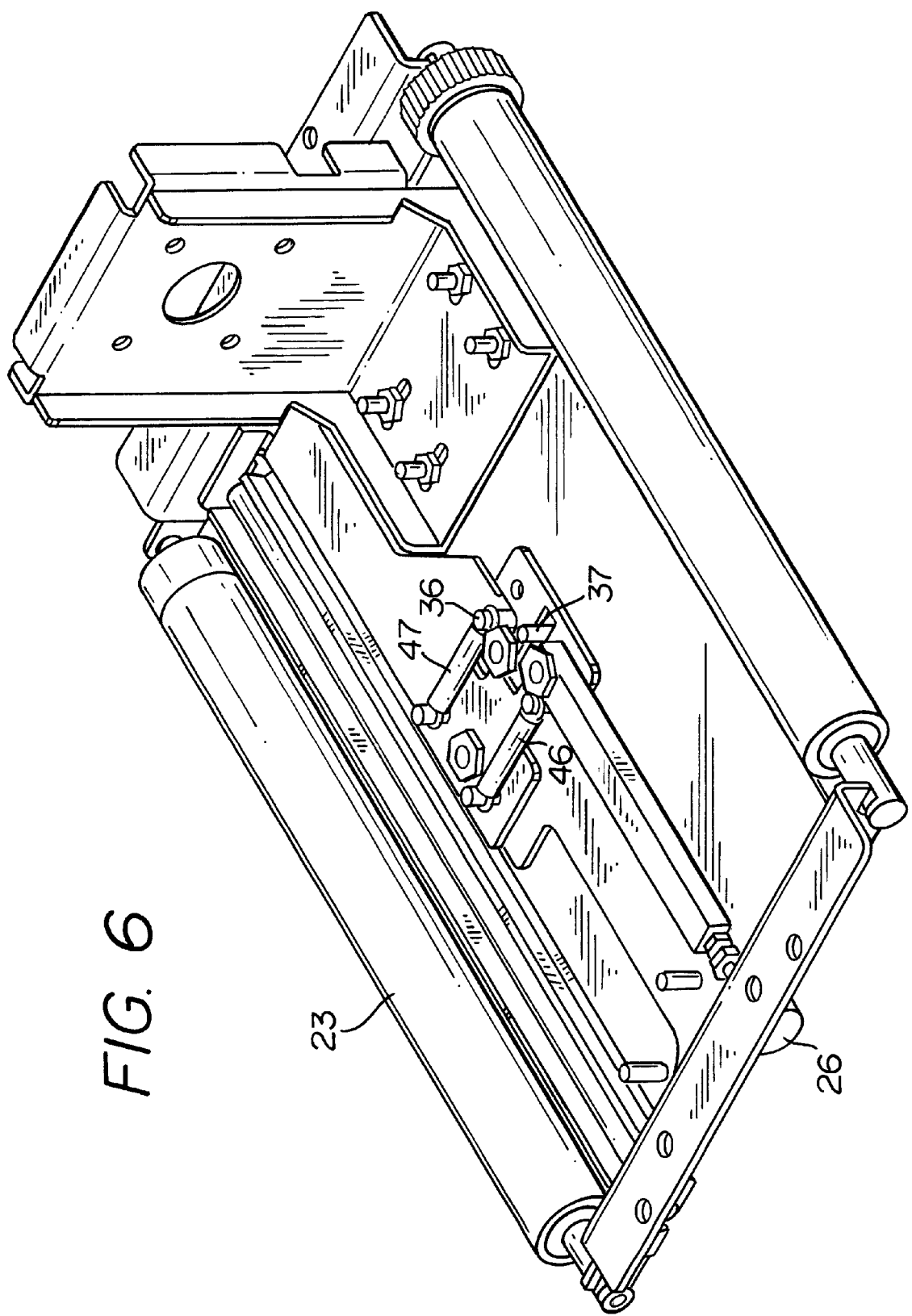
FIG. 6 is a perspective view of the second embodiment of the present invention which utilizes two tension springs.
Figure 7:
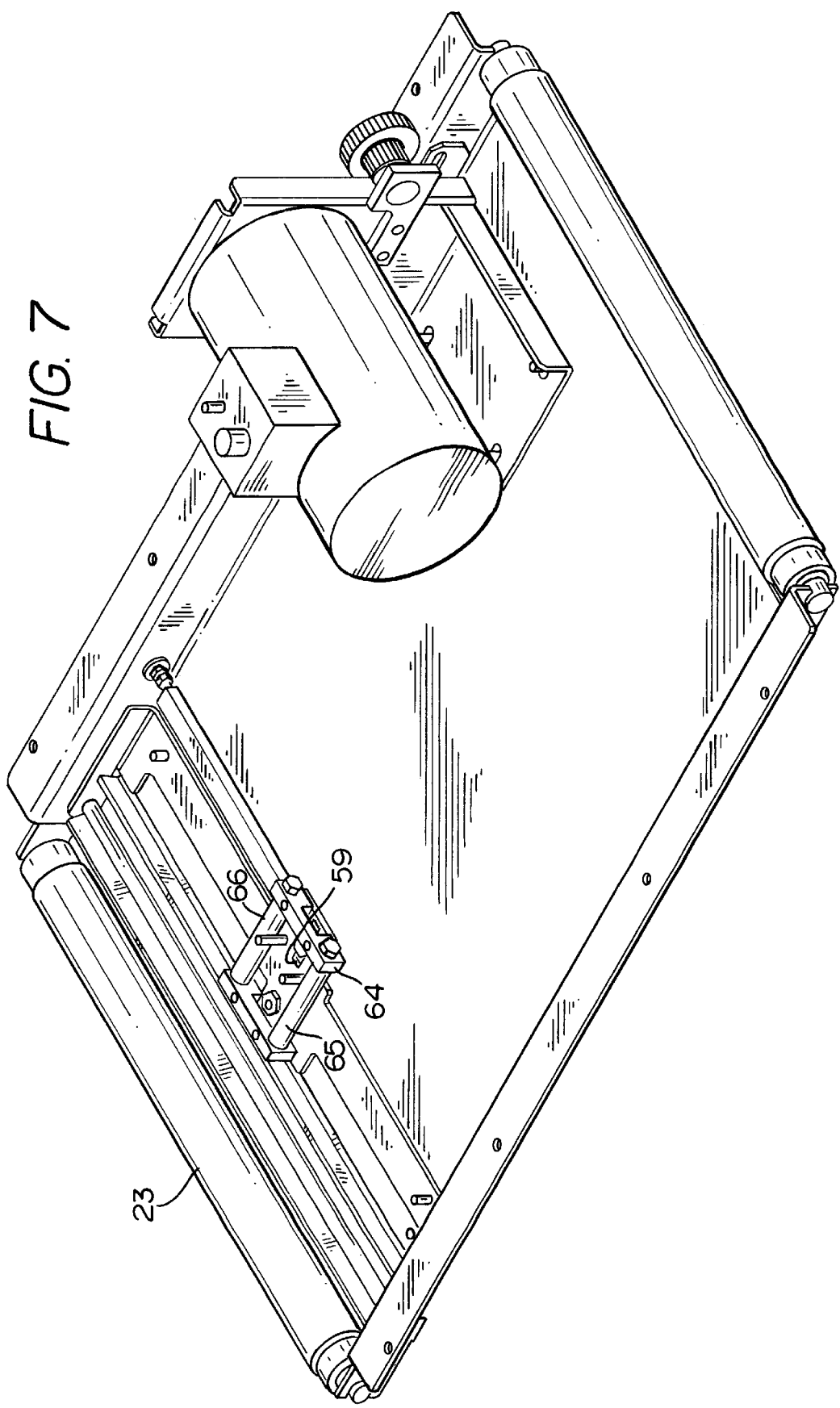
FIG. 7 is a perspective view of the third embodiment of the present invention which utilizes two compression springs.
Figure 8:
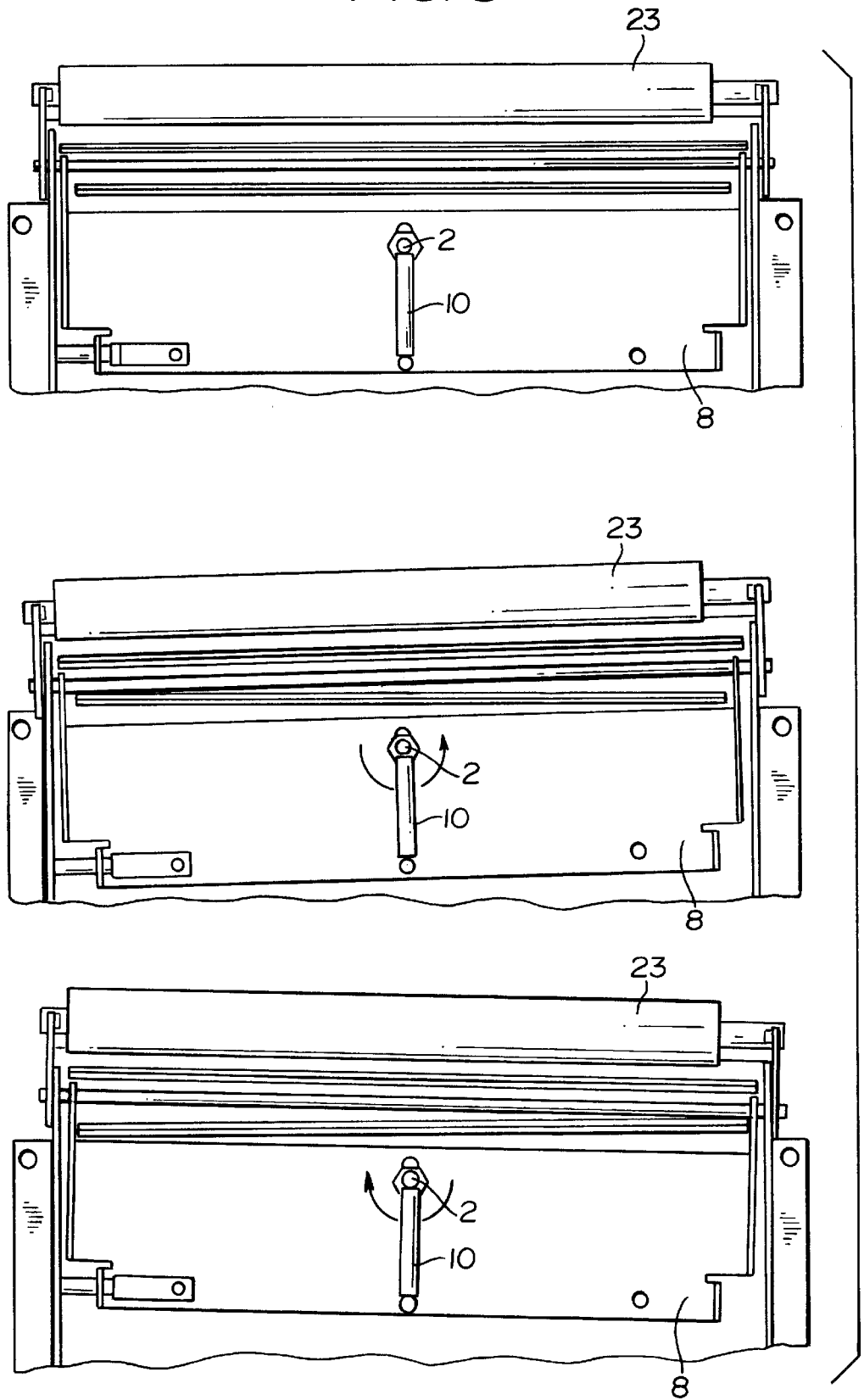
FIG. 8 is a plan view of the portion of the present invention depicted in FIG. 4, showing the present invention in three different possible positions attained during normal use.

Referring now to FIGS. 2 and 6, a second embodiment of the present invention is depicted. In this embodiment, a pivot plate 32 is formed to include slot 33 and spindles 34, 35 and 36. A spindle 37 extends upwardly from sliding bed 38 and extends through the slot 33. A connector plate 39 is formed to include indentations 40 and 41 which are adapted to retain spindles 34 and 36. Connector plate 39 also includes slot 42, into which spindle 35 is inserted. An orifice 43 formed within plate 39 receives spindle 37, the entire arrangement permitting rotational movement of the conveyor roller 23 about spindle 37 as well as longitudinal movement as defined by slots 33 and 42.

Connector plate 39 also includes spring mounting spindles 44 and 45. First tension spring 46 is secured between spindle 44 and 34, while second tensions spring 47 extends between spindle 45 and 36. The two springs urge conveyor roller 23 in the direction of arrow 24, thereby applying a tensile force to belt 1. Fastener 26 extends into arm 74, the arm 74 fitting over bolt 75. Movement of arm 74 by rotation of fastener 26 causes a rotational force to be applied to pivot plate 32 via connector plate 39.

Figure 3:
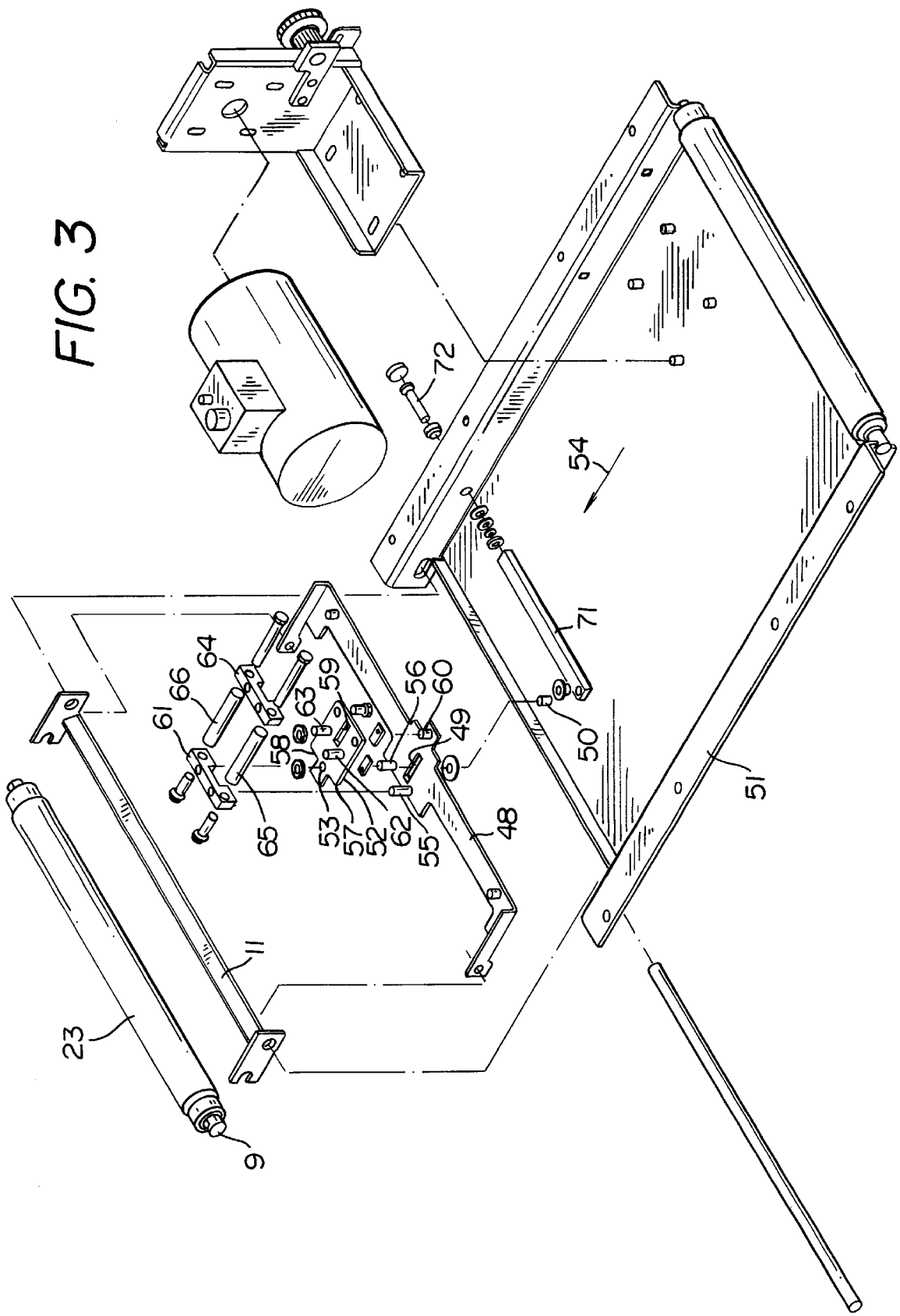
FIG. 3 is an exploded perspective view of a third embodiment of the present invention which utilizes two compression springs.

Referring to FIG. 3, a third embodiment of the present invention can be understood. In this embodiment, the pivot plate 48 is formed to include a centrally located elongated slot 49, through which the spindle 50 of bed 51 is inserted. A threaded fastener 72 enters a threaded bore (not shown) of the control arm 71. A connector plate 52 is formed to include orifice 53 which retains the spindle 50. A rear yoke 61 is mounted on spindles 55 and 56 which extend upwardly from pivot plate 48. The rear yoke 61 is positioned so as to abut the shoulders 57 and 58 which are formed as part of connector plate 52, thereby applying a longitudinal force on connector plate 52.

Connector plate 52 is also formed to include a longitudinal slot 59 which receives the forward spindle 60 formed on the pivot plate 48. Positioned on either side of the slot 59 are spindles 62 and 63, which are adapted to receive forward yoke 64. Mounted between the two yokes 61 and 64 are a pair of compression springs 65 and 66. The effect of this mounting arrangement is to bias the pivot plate and the conveyor roller 23 in the direction of arrow 54, thereby providing tension to the conveyor belt 1.

As those of ordinary skill in the art will appreciate, variations may be made in the invention as set forth herein without departing from the scope of the invention as defined by the following claims.

We claim:

1. A method of controlling the path followed by a moving conveyor belt while providing a fixed tensile force to the conveyor belt, comprising the steps of:
    (a) mounting the conveyor belt on a pivotable roller;
    (b) mounting the pivotable roller on a pivotable yoke;
    (c) mounting the pivotable yoke on a pivotable plate;
    (d) mounting the pivotable plate on a fixed slider bed such that the pivotable plate is constrained to translational movement substantially parallel to the direction of belt travel and is constrained to rotational movement about a substantially vertical axis;
    (e) biasing the pivotable plate in the direction of the conveyor roller, thereby providing a tensile force to the conveyor belt;
    (f) rotating the pivotable plate in order to orient the conveyor belt along a desired path;
    (g) affixing a block to the pivotable plate, manipulation of the block causing rotation of the pivotable plate;
    (h) forming a first threaded bore within the block;
    (i) forming a bearing within the slider bed that is a aligned with the first threaded bore;
    (j) inserting a threaded fastener into the first threaded bore and through the bearing, rotation of the threaded fastener causing rotation of the pivotable plate;
    (k) forming a substantially vertical spindle on the slider bed;
    (l) forming a slot within the pivotable plate; and
    (m) inserting the vertical spindle through the slot, thereby permitting rotational movement and limited longitudinal movement of the pivotable plate about the spindle.

2. The method of claim 1, further comprising the steps of:
    (a) forming a spindle on the pivotable plate; and
    (b) placing a spring between the vertical spindle on the slider bed and the spindle on the pivotable plate, thereby urging the pivotable plate toward the conveyor roller.

3. The method of claim 2, further comprising the steps of:
    (a) selecting the spring such that the spring will exert a maximum tensile force that is less than a force which would cause damage to the belt; and
    (b) rotating the pivotable plate so as to cause the conveyor roller to reorient the path followed by the moving conveyor belt.

4. The method of claim 3, further comprising the steps of:
    (a) moving the pivotable yoke from a first position to a second position, the second position being substantially orthogonal to the first position; and
    (b) mounting the pivotable yoke on a shaft, the shaft permitting the pivotable yoke to rotate about an axis that is substantially parallel to the conveyor roller.

5. The method of claim 4, further comprising the step of biasing the pivotable plate in a direction substantially perpendicular to the shaft upon which the pivotable yoke is mounted.

6. An apparatus for tensioning and directing the path of a moving conveyor belt, comprising:
    (a) a slider bed, the slider bed serving as a rigid frame above which the moving conveyor belt travels;
    (b) a spindle, the spindle being rigidly fixed to the slider bed, the spindle being substantially orthogonal to the slider bed;
    (c) a pivotable plate, the pivotable plate being pivotably mounted on the spindle, the pivotable plate being rotatable within a plane substantially parallel to a plane occupied by the moving conveyor belt;
    (d) a conveyor roller, the conveyor roller being mechanically interconnected to the pivotable plate, the conveyor belt travelling around the conveyor roller such that rotation of the pivotable plate reorients the conveyor roller and alters the path of the moving conveyor belt;
    (e) a connector plate, the connector plate being slidably mounted to the pivotable plate, manipulation of the connector plate causing rotation of the pivotable plate;
    (f) a control arm, the control arm being pivotably mounted to the connector plate, manipulation of the control arm causing rotation of the pivotable plate; and
    (g) at least one spring, the spring extending between the connector plate and the pivotable plate, the spring being anchored to the spindle affixed to the slider bed, the spring urging the pivotable plate toward the conveyor roller.

7. The apparatus of claim 6, further comprising:
    (a) a mounting yoke, the mounting yoke being adapted to retain the conveyor roller;
    (b) a shaft, the shaft extending through the mounting yoke and the pivotable plate, the mounting yoke being pivotable about the shaft and the pivotable plate.

8. The apparatus of claim 7, further comprising:
    (a) a threaded bore formed longitudinally into the control arm; and
    (b) a threaded fastener, the threaded fastener being anchored to the slider bed, the threaded fastener being threadably inserted into the threaded bore such that rotation of the threaded fastener causes lateral movement of the control arm.

9. A device for providing a constant tensile force to a conveyor belt while providing a means for adjusting the path followed by the moving conveyor belt, comprising:

(a) a rigid conveyor framework;

(b) a spindle extended upwardly from a central region of the rigid conveyor framework;

(c) a pivotable plate, the pivotable plate being formed to include and elongated slot, the spindle being inserted through the elongated slot;

(d) a mounting yoke, the mounting yoke being pivotably mounted to the pivotable plate;

(e) a conveyor roller, the conveyor roller being mounted on the mounting yoke, the moving conveyor belt passing over the conveyor roller;

(f) a connector plate, the connector plate being slidably interconnected to the pivot plate; and (g) a pair of compression springs, the compression springs being mounted between the pivotable plate and the connector plate, the compression springs biasing the pivotable plate toward the conveyor roller.

10. The device of claim 9, further comprising:

(a) a first mounting block, the first mounting block being rigidly affixed to the pivotable plate;

(b) a second mounting block, the second mounting block being rigidly affixed to the connector plate, the pair of compression springs being retained between the first and second mounting blocks, the compression springs urging the first and second mounting blocks away from each other.

11. The device of claim 10, further comprising as control arm, the control arm being pivotably affixed to the connector plate, manipulation of the control arm causing rotation of the pivotable plate about the spindle, thereby reorienting the conveyor roller and altering the path followed by the conveyor belt.

* * * * *